(12) United States Patent
Xie et al.

(10) Patent No.: US 11,729,042 B2
(45) Date of Patent: *Aug. 15, 2023

(54) IPSEC ACCELERATION METHOD, APPARATUS, AND SYSTEM

(71) Applicant: Huawei Technologies Co., Ltd., Shenzhen (CN)

(72) Inventors: Yuming Xie, Nanjing (CN); Xinyu Hu, Xi'an (CN); Yuping Zhao, Nanjing (CN); Fan Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/351,994

(22) Filed: Jun. 18, 2021

(65) Prior Publication Data

US 2021/0314214 A1    Oct. 7, 2021

Related U.S. Application Data

(63) Continuation of application No. 15/670,736, filed on Aug. 7, 2017, now Pat. No. 11,063,812, which is a (Continued)

(30) Foreign Application Priority Data

Feb. 5, 2015    (CN) .......................... 201510059986.4

(51) Int. Cl.
*H04L 41/0273*    (2022.01)
*H04L 9/40*    (2022.01)
(Continued)

(52) U.S. Cl.
CPC ........ *H04L 41/0286* (2013.01); *H04L 9/0841* (2013.01); *H04L 41/0893* (2013.01); (Continued)

(58) Field of Classification Search
CPC .............. H04L 41/0286; H04L 9/0841; H04L 41/0893; H04L 63/061; H04L 63/164; H04L 63/205; H04W 76/10
(Continued)

(56) References Cited

U.S. PATENT DOCUMENTS 6,697,878 B1    2/2004  Imai
7,350,233 B1 *  3/2008  Lee .......................... H04L 63/20
                                                                  713/153

(Continued)

FOREIGN PATENT DOCUMENTS

CN          1838590 A    9/2006
CN        101697522 A    4/2010
(Continued)

OTHER PUBLICATIONS

Xiao-Zhuo, G., et al., "Implementation of IPSec in High Performance router," XP031012600, 6th International Conference on ITS Telecommunications Proceedings, Jun. 30, 2006, pp. 1057-1060.
(Continued)

*Primary Examiner* — Hermon Asres
(74) *Attorney, Agent, or Firm* — Conley Rose, P.C.

(57) ABSTRACT

An Internet Protocol Security (IPsec) acceleration method includes generating, by an Internet Key Exchange (IKE) device, an IKE link establishment session packet according to an IPSec configuration parameter and a security policy in a security policy database (SPD), sending, by the IKE device, the IKE link establishment session packet to a peer device, establishing a security association (SA) with the peer device, and sending, by the IKE module, the SA to a data forwarding device, where the IKE device and the data forwarding device are discrete devices.

39 Claims, 6 Drawing Sheets

Related U.S. Application Data continuation of application No. PCT/CN2015/093381, filed on Oct. 30, 2015.

(51) Int. Cl.
*H04L 41/0893* (2022.01)
*H04L 9/08* (2006.01)
*H04W 76/10* (2018.01)

(52) U.S. Cl.
CPC .......... *H04L 63/061* (2013.01); *H04L 63/164* (2013.01); *H04L 63/205* (2013.01); *H04W 76/10* (2018.02)

(58) Field of Classification Search
USPC ........................................................ 709/227
See application file for complete search history.

(56) References Cited

U.S. PATENT DOCUMENTS

| | | | |
|---|---|---|---|
| 7,536,548 | B1 | 5/2009 | Btake et al. |
| 2004/0062399 | A1 | 4/2004 | Takase |
| 2006/0104308 | A1* | 5/2006 | Pinkerton ............. H04L 69/321 370/469 |
| 2008/0137863 | A1* | 6/2008 | Thomas ................ H04W 12/04 380/273 |
| 2008/0178289 | A1* | 7/2008 | Gearhart ............... H04L 63/164 726/22 |
| 2009/0041006 | A1 | 2/2009 | Chiu |
| 2009/0113201 | A1* | 4/2009 | MacKey .................. H04L 9/00 713/161 |
| 2009/0122990 | A1 | 5/2009 | Gundavelli et al. |
| 2010/0097992 | A1* | 4/2010 | Velev ..................... H04L 12/66 370/328 |
| 2010/0161843 | A1* | 6/2010 | Spry ........................ G06F 3/067 710/22 |
| 2011/0078436 | A1 | 3/2011 | Sato |
| 2011/0113236 | A1* | 5/2011 | Chenard ............... H04L 63/164 713/154 |
| 2011/0216743 | A1* | 9/2011 | Bachmann ........... H04L 63/164 370/331 |
| 2011/0228934 | A1 | 9/2011 | Fukuda |

FOREIGN PATENT DOCUMENTS

| | | |
|---|---|---|
| JP | 2000020490 A | 1/2000 |
| JP | 2003110628 A | 4/2003 |
| JP | 2004128782 A | 4/2004 |
| JP | 2006041684 A | 2/2006 |
| JP | 2009003479 A | 1/2009 |
| JP | 2011199537 A | 10/2011 |

OTHER PUBLICATIONS

Watanabe, M., et al., "GPU implementation of Ciphers using Schematic to Program Translator (SPT)," Technical report of the Institute of Electronics Information Communication Engineers, the Institute of Electronics Information Communication Engineers, Aug. 29, 2014, vol. 114, No. 203, 11 pages.

Translation of Watanabe, M., et al, "GPU implementation of Ciphers using Schematic to Program Translator (SPT)," Technical report of the Institute of Electronics Information Communication Engineers, the Institute of Electronics Information Communication Engineers, Aug. 29, 2014, vol. 114, No. 203, 3 pages.

EZ Chip, "TILE-Gx8072 Processor Product Brief" Jan. 22, 2015, 2 pages.

* cited by examiner

IPSEC ACCELERATION METHOD, APPARATUS, AND SYSTEM

CROSS-REFERENCE TO RELATED APPLICATIONS

This is a continuation of U.S. patent application Ser. No. 15/670,736 filed on Aug. 7, 2017, which is a continuation of International Patent Application No. PCT/CN2015/093381 filed on Oct. 30, 2015, which claims priority to Chinese Patent Application No. 201510059986.4 filed on Feb. 5, 2015. All of the aforementioned applications are hereby incorporated by reference in their entireties.

TECHNICAL FIELD

Embodiments of the present disclosure relate to cyber security technologies, and in particular, to an Internet Protocol Security (IPsec) acceleration method, an apparatus, and a system.

BACKGROUND

Rapid development of network services requires higher network information security. The Internet Engineering Task Force (IETF) has developed IPSec to ensure communication security.

An IPSec workflow is divided into two stages.

The first stage is Internet Key Exchange (IKE) link establishment. The IKE link establishment provides, for IPSec, services of automatic negotiation of key exchange (KE) and security association (SA) establishment. IKE link establishment includes IKE SA payload exchange, a KE payload, nonce payload exchange, calculation of a shared key parameter and identity authentication by two communication parties, IPSec SA payload exchange, negotiation of an IPSec SA verification algorithm and encryption algorithm, and the like.

The second stage is data forwarding. An Internet Protocol (IP) packet is forwarded after being encrypted/decrypted and encapsulated/decapsulated.

In other approaches, when a key management tool Pluto of an open source product Openswan that runs on a LINUX operating system platform performs IKE link establishment, a single-thread and single-state machine handles, in user mode, all work of IKE link establishment. That is, a packet for next IKE link establishment can be received and processed only after all packets for current IKE link establishment are processed. This causes a heavy burden on Pluto and a low link establishment speed. In addition, IKE link establishment and data forwarding are completed by a single virtual machine (VM) or a host. Because a processing capability of the VM or the host is limited, IKE link establishment is affected, and data forwarding is slow.

SUMMARY

Embodiments of the present disclosure provide an IPSec acceleration method, an apparatus, and a system in order to resolve a problem of slow IKE link establishment and data forwarding in existing IPSec.

According to a first aspect, an embodiment of the present disclosure provides an IPSec acceleration method, including generating, by an IKE module, an IKE link establishment session packet according to an IPSec configuration parameter and a security policy that is in a security policy database (SPD), sending, by the IKE module, the IKE link establishment session packet to a peer device, establishing an SA with the peer device, and sending, by the IKE module, the SA to a data forwarding module, where the IKE module and the data forwarding module are discrete modules.

According to the first aspect, in a first possible implementation manner of the first aspect, the IKE module is deployed on a field-programmable gate array (FPGA) chip of an accelerator card, and generating, by an IKE module, an IKE link establishment session packet according to an IPSec configuration parameter and a security policy that is in an SPD includes processing concurrently, by the IKE module using a Montgomery algorithm according to the IPSec configuration parameter and the security policy that is in the SPD, modular multiplication required for IKE session link establishment, generating a googol, calculating a Diffie-Hellman key value, and generating the IKE link establishment session packet.

According to the first aspect or the first possible implementation manner of the first aspect, in a second possible implementation manner of the first aspect, sending, by the IKE module, the SA to a data forwarding module includes writing, by the IKE module, the SA into the data forwarding module by means of remote direct memory access (RDMA) or a preset protocol.

According to the first aspect or the first possible implementation manner of the first aspect, in a third possible implementation manner of the first aspect, sending, by the IKE module, the SA to a data forwarding module includes writing, by the IKE module, the SA into a control module by means of RDMA or a preset protocol, and forwarding the SA to the data forwarding module using the control module.

According to a second aspect, an embodiment of the present disclosure provides an IPSec acceleration method, including receiving, by an IKE module, an IKE link establishment session packet, establishing, by the IKE module according to an IPSec configuration parameter and a security policy that is in an SPD, an SA with a sending device of the IKE link establishment session packet, and sending, by the IKE module, the SA to a data forwarding module, where the IKE module and the data forwarding module are discrete modules.

According to the second aspect, in a first possible implementation manner of the second aspect, the IKE module is deployed on an FPGA chip of an accelerator card, and establishing, by the IKE module according to an IPSec configuration parameter and a security policy that is in an SPD, an SA with a sending device of the IKE link establishment session packet includes processing concurrently, by the IKE module using a Montgomery algorithm according to the IPSec configuration parameter and the security policy that is in the SPD, modular multiplication required for IKE session link establishment, generating a googol, calculating a Diffie-Hellman key value, and establishing the SA with the sending device of the IKE link establishment session packet.

According to the second aspect or the first possible implementation manner of the second aspect, in a second possible implementation manner of the second aspect, sending, by the IKE module, the SA to a data forwarding module includes writing, by the IKE module, the SA into the data forwarding module by means of RDMA or a preset protocol.

According to the second aspect or the first possible implementation manner of the second aspect, in a third possible implementation manner of the second aspect, sending, by the IKE module, the SA to a data forwarding module includes writing, by the IKE module, the SA into a control module by means of RDMA or a preset protocol, and forwarding the SA to the data forwarding module using the control module.

According to a third aspect, an embodiment of the present disclosure provides an IPSec acceleration method, including receiving, by a data forwarding module, a data packet, where the data forwarding module is deployed on an FPGA chip of an accelerator card, performing, by the data forwarding module according to an SA, a concurrent operation of an encryption/decryption algorithm and an authentication manner on the data packet to obtain a target packet, and forwarding, by the data forwarding module, the target packet.

According to the third aspect, in a first possible implementation manner of the third aspect, before the performing, by the data forwarding module according to an SA, a concurrent operation of an encryption/decryption algorithm and an authentication manner on the data packet, to obtain a target packet, the method further includes accepting, by the data forwarding module, an operation of writing the SA by an IKE module, where a writing manner used for the writing is RDMA or a preset protocol, and the data forwarding module and the IKE module are discrete modules.

According to a fourth aspect, an embodiment of the present disclosure provides an IKE module, including a processing unit and a sending unit, where the sending unit includes a first sending subunit and a second sending subunit, the processing unit is configured to generate an IKE link establishment session packet according to an IPSec configuration parameter and a security policy that is in an SPD. The first sending subunit is configured to send the IKE link establishment session packet to a peer device, and the IKE module establishes an SA with the peer device using the IKE link establishment session packet, and the second sending subunit is configured to send the SA to a data forwarding module, where the IKE module and the data forwarding module are discrete modules.

According to the fourth aspect, in a first possible implementation manner of the fourth aspect, the IKE module is deployed on an FPGA chip of an accelerator card, and the processing unit is further configured to process concurrently, using a Montgomery algorithm according to the IPSec configuration parameter and the security policy that is in the SPD, modular multiplication required for IKE session link establishment, generate a googol, calculate a Diffie-Hellman key value, and generate the IKE link establishment session packet.

According to the fourth aspect or the first possible implementation manner of the fourth aspect, in a second possible implementation manner of the fourth aspect, the second sending subunit is further configured to write the SA into the data forwarding module by means of RDMA or a preset protocol.

According to the fourth aspect or the first possible implementation manner of the fourth aspect, in a third possible implementation manner of the fourth aspect, the second sending subunit is further configured to write the SA into a control module by means of RDMA or a preset protocol, and forward the SA to the data forwarding module using the control module.

According to a fifth aspect, an embodiment of the present disclosure provides an IKE module, including a receiving unit configured to receive an IKE link establishment session packet, a processing unit configured to establish, according to an IPSec configuration parameter and a security policy that is in an SPD, an SA with a sending device of the IKE link establishment session packet, and a sending unit configured to send the SA to the data forwarding module, where the IKE module and the data forwarding module are discrete modules.

According to the fifth aspect, in a first possible implementation manner of the fifth aspect, the IKE module is deployed on an FPGA chip of an accelerator card, and the processing unit is further configured to process concurrently, using a Montgomery algorithm according to the IPSec configuration parameter and the security policy that is in the SPD, modular multiplication required for IKE session link establishment, generate a googol, calculate a Diffie-Hellman key value, and establish the SA with the sending device of the IKE link establishment session packet.

According to the fifth aspect or the first possible implementation manner of the fifth aspect, in a second possible implementation manner of the fifth aspect, the sending unit is further configured to write the SA into the data forwarding module by means of RDMA or a preset protocol.

According to the fifth aspect or the first possible implementation manner of the fifth aspect, in a third possible implementation manner of the fifth aspect, the sending unit is further configured to write the SA into a control module by means of RDMA or a preset protocol, and forward the SA to the data forwarding module using the control module.

According to a sixth aspect, an embodiment of the present disclosure provides a data forwarding module, where the data forwarding module is deployed on an FPGA chip of an accelerator card, and the data forwarding module includes a receiving unit configured to receive a data packet, a processing unit configured to perform, according to an SA, a concurrent operation of an encryption/decryption algorithm and an authentication manner on the data packet, to obtain a target packet, and a sending unit configured to forward the target packet.

According to the sixth aspect, in a first possible implementation manner of the sixth aspect, the data forwarding module further includes a storage unit, and the storage unit is configured to accept an operation of writing the SA by an IKE module, where a writing manner used for the writing is RDMA or a preset protocol, and the data forwarding module and the IKE module are discrete modules.

According to a seventh aspect, an embodiment of the present disclosure provides an IPSec acceleration system, including the IKE module according to any one of the fourth aspect, or the first to the third possible implementation manners of the fourth aspect, and the data forwarding module according to either the sixth aspect or the first possible implementation manner of the sixth aspect, the IKE module according to any one of the fifth aspect, or the first to the third possible implementation manners of the fifth aspect, and the data forwarding module according to either the sixth aspect or the first possible implementation manner of the sixth aspect, or the IKE module according to any one of the fourth aspect, the first to the third possible implementation manners of the fourth aspect, the IKE module according to any one of the fifth aspect, or the first to the third possible implementation manners of the fifth aspect, and the data forwarding module according to either the sixth aspect or the first possible implementation manner of the sixth aspect.

According to the IPSec acceleration method, the apparatus, and the system that are provided in the embodiments of the present disclosure, IKE link establishment is implemented using an IKE module, and a data packet is forwarded using a data forwarding module. The IKE module and the data forwarding module are independent of each other and can be deployed separately in different devices. Therefore, performance of the two devices does not affect each other, thereby improving a speed and flexibility of IPSec and resolving a problem of slow IKE link establishment and data forwarding in existing IPSec.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

A basic idea of the embodiments of the present disclosure is to separate IKE link establishment logically from data forwarding and deploy IKE link establishment and data forwarding in a physically unlimited manner, for example, on different devices, such as accelerator cards, VMs, servers, and clusters. This can accelerate IKE link establishment and improve a data forwarding capability. In addition, high performance and flexibility can be ensured.

Figure 1:
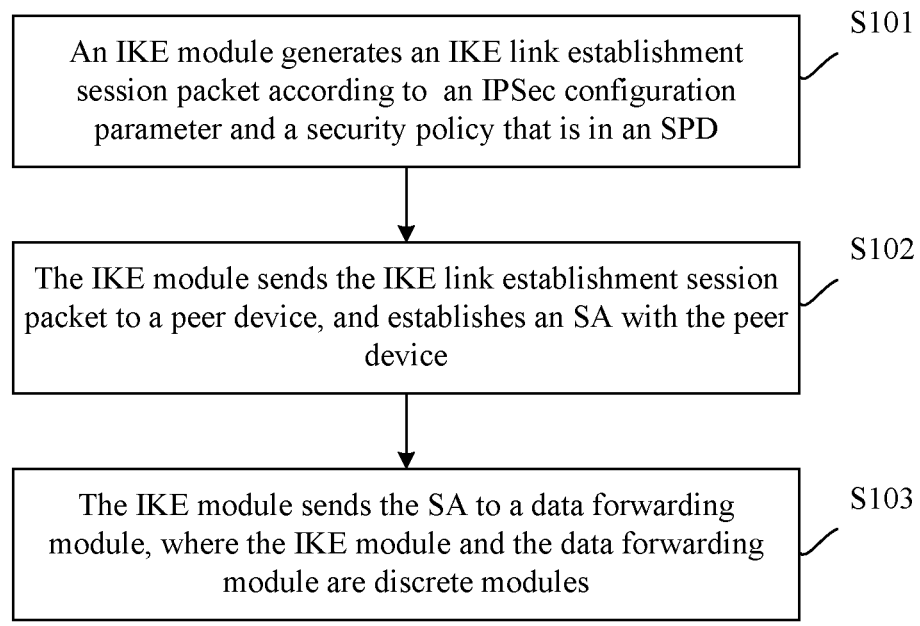
FIG. 1 is a flowchart of Embodiment 1 of an IPSec acceleration method according to the present disclosure.

FIG. 1 is a flowchart of Embodiment 1 of an IPSec acceleration method according to the present disclosure. This embodiment of the present disclosure provides an IPSec acceleration method. The method may be executed by any apparatus that executes an IPSec acceleration method, and the apparatus may be implemented using software and/or hardware. As shown in FIG. 1, the method includes the following steps.

Step S101: An IKE module generates an IKE link establishment session packet according to an IPSec configuration parameter and a security policy that is in an SPD.

The SPD includes at least one security policy, and the security policy determines a security service to be provided for a data packet. The security policy includes a feature of a data packet that needs to be protected, how to protect the data packet, for example, a data packet processing method, such as an encryption algorithm, used for protecting the data packet, and information about a transmit end and a receive end of the data packet.

The IPSec configuration parameter includes but is not limited to the parameters a gateway IP address, a subnet device IP address, an IPSec working mode, an encapsulation format, an IKE SA, and an IKE SA life cycle. The IPSec working mode includes a tunnel mode and a transport mode.

Step S102: The IKE module sends the IKE link establishment session packet to a peer device, and establishes an SA with the peer device.

The IKE module determines, as the peer device according to the SPD, a device that receives the IKE link establishment session packet, and sends the IKE link establishment session packet to the peer device to trigger an IKE negotiation with the peer device, thereby obtaining the SA.

Further, IKE link establishment includes two stages, a first-stage IKE negotiation and a second-stage IKE negotiation. Therefore, the SA includes an IKE SA and an IPSec SA. The first-stage IKE negotiation generates the IKE SA, and the second-stage IKE negotiation generates the IPSec SA. The second-stage IKE negotiation is performed under protection of the IKE SA.

Step S103: The IKE module sends the SA to a data forwarding module, where the IKE module and the data forwarding module are discrete modules.

In this embodiment, the IKE module and the data forwarding module are discrete, that is, independent of each other. Therefore, the two modules may be integrated in one device or separately deployed in different devices. That is, the two modules are separated logically and deployed in a physically unlimited manner.

It can be known from the foregoing steps that the IKE module can complete IKE link establishment and obtain the SA. In addition, the data forwarding module performs data packet forwarding (data forwarding) according to the SA.

In other approaches, both IKE link establishment and data forwarding are completed by a single VM or physical machine, causing a low IPSec speed.

In this embodiment of the present disclosure, a module configured to implement an IKE link establishment function and a module configured to implement a data forwarding function are logically separated. That is, IKE link establishment is implemented using an IKE module, and a data packet is forwarded using a data forwarding module. The IKE module and the data forwarding module are independent of each other. In this way, establishment of an IPSec session can be accelerated, and flexibility of IPSec processing can be enhanced. The foregoing beneficial effects are relatively obvious in a wireless local area network (WLAN) in a high-density access scenario.

Based on the foregoing embodiment, in an implementation manner, the IKE module can be deployed on an FPGA of an accelerator card. In this implementation manner, step S101 may include processing concurrently, by the IKE module using a Montgomery algorithm according to the IPSec configuration parameter and the security policy that is in the SPD, modular multiplication required for IKE session link establishment, generating a googol, calculating a Diffie-Hellman key value, and generating the IKE link establishment session packet. The googol is, for example, 1024 bits, 2048 bits, or the like. The IKE module is deployed on the FPGA chip of the accelerator card, reducing time consumption for googol generation and Diffie-Hellman key value calculation, and the like.

It is additionally noted that, in a Gx8072 processor, a Multistream iMesh Coprocessing Accelerator (MiCA) module completes IKE link establishment and data packet forwarding. The MiCA module has a 40 gigabits per second (Gbps) IPSec/Secure Sockets Layer (SSL) protocol processing capability. All IPSec work is delivered to and completed by the MiCA module. In an actual scenario, if only an IPSec function is needed, any other attribute of the MiCA module is unnecessary, causing a waste of resources and an increase in costs. In addition, the MiCA module processes IPSec, an IKE link establishment speed and a data packet forwarding bandwidth capability are fixed values and cannot be increased on demand. In this embodiment of the present disclosure, the IKE module is deployed on the FPGA chip such that an IKE link establishment speed can change on demand and, therefore, can be increased on demand.

In this implementation manner, the IKE module is deployed in an acceleration device. The FPGA chip of the accelerator card is only an example, and the present disclosure is not limited thereto.

Further, step S103 may include writing, by the IKE module, the SA into the data forwarding module by means of RDMA or a preset protocol. For example, the SA is written into memory of the data forwarding module. Alternatively, step S103 may include writing, by the IKE module, the SA into a control module by means of RDMA or a preset protocol, and forwarding the SA to the data forwarding module using the control module. Optionally, the IKE module may further write the security policy into the data forwarding module by means of RDMA or a preset protocol. When the IKE module transmits the SA by writing, by means of RDMA, the SA into the memory of the data forwarding module, a transmission rate can exceed 20 Gbps.

A specific type of the preset protocol is not limited in the present disclosure. For example, the SA may be transmitted between the IKE module and the data forwarding module using any private or public protocol.

Figure 2:
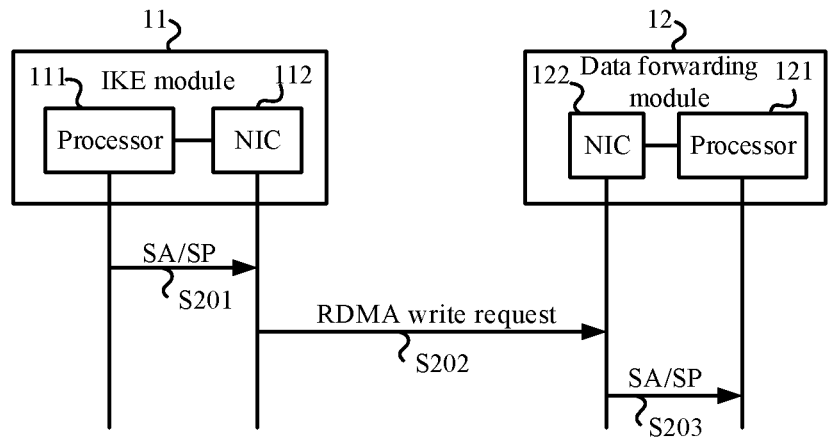
FIG. 2 is a diagram of an example of writing, by an IKE module, an SA/a security policy into a data forwarding module using RDMA in Embodiment 1 of an IPSec acceleration system according to the present disclosure.

As shown in FIG. 2, RDMA is used as an example to explain how an IKE module 11 writes an SA/a security policy into a data forwarding module 12. The IKE module 11 includes a processor (for example, a central processing unit (CPU)) 111, a memory (for example, a random access memory (RAM)) (not shown) connected to the processor 111, and a Network Interface Card (NIC) 112. The data forwarding module 12 includes a processor (for example, a CPU) 121, a memory (for example, a RAM) (not shown) connected to the processor 121, and an NIC 122. An RDMA process is as follows.

Step S201: The processor 111 writes an SA/a security policy (designated as SP in FIG. 2) that is set in the memory of the IKE module 11 into the NIC 112 according to a bus and interface standard (e.g., Peripheral Component Interconnect Express (PCI-E)).

Data written into the NIC 112 includes a memory start address at which the SA/security policy is stored, a length of the SA/security policy, and the like.

It should be noted that, in this embodiment, RDMA is used as an example to describe data transmission between modules, and therefore, a PCI-E bus interface is used. If another preset protocol, for example, a proprietary protocol, is used, a bus interface type is not limited in the present disclosure and may be a PCI-E bus interface or another bus interface.

Step S202: The NIC 112 sends an RDMA write request to the NIC 122.

The RDMA write request carries the SA/security policy. A function corresponding to the RDMA write request is, for example, Write(local_buf, size, remote_addr), where local_buf is used to represent a location at which the SA/security policy is buffered in the NIC 112, size is used to represent the length of the SA/security policy, and remote_addr is used to represent a remote destination address, that is, an address into which the SA/security policy is written in the NIC 122.

Step S203: The processor 121 writes the SA/security policy (designated as SP in FIG. 2) in the NIC 122 into the memory of the data forwarding module 12 by means of PCI-E direct memory access (DMA).

In other approaches, it is relatively time-consuming for Pluto to write an SA from a user mode to a kernel mode. However, in this embodiment, the IKE module quickly transfers the SA into the remote data forwarding module by means of RDMA, without affecting an operating system. In this way, few processing functions of a computer are used. Because RDMA avoids a replication operation in an external memory and a text exchange operation, a memory bandwidth and a CPU period can be released for improving application system performance.

In the foregoing embodiment, the IKE module sends the IKE link establishment session packet to the peer device, and establishes the SA with the peer device. Correspondingly, a corresponding process on a peer device side is described below.

Figure 3:
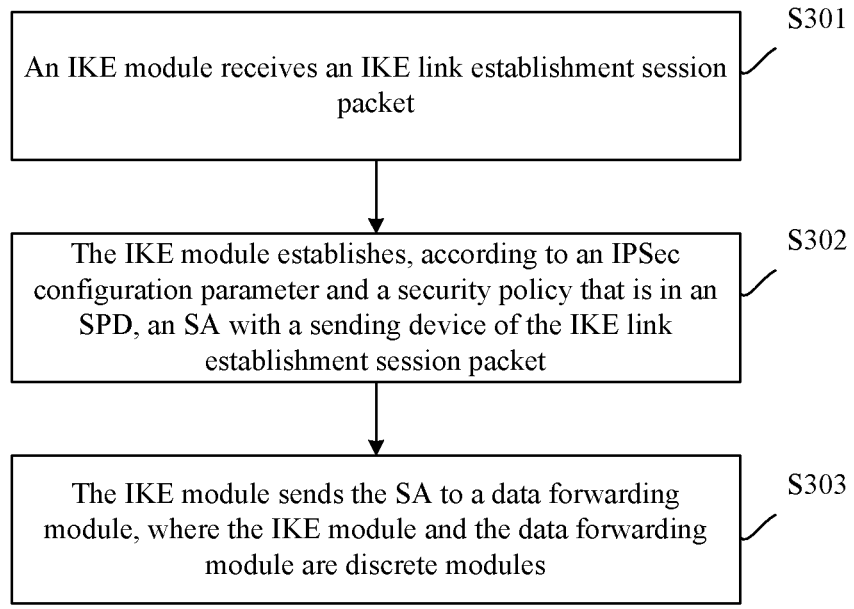
FIG. 3 is a flowchart of Embodiment 2 of an IPSec acceleration method according to the present disclosure.

FIG. 3 is a flowchart of Embodiment 2 of an IPSec acceleration method according to the present disclosure. This embodiment of the present disclosure provides an IPSec acceleration method. The method may be executed by any apparatus (in this embodiment, an IKE module is used as an example for description) that executes an IPSec acceleration method, and the apparatus may be implemented using software and/or hardware. As shown in FIG. 3, the method includes the following steps.

Step S301: An IKE module receives an IKE link establishment session packet.

Step S302: The IKE module establishes, according to an IPSec configuration parameter and a security policy that is in an SPD, an SA with a sending device of the IKE link establishment session packet.

Step S303: The IKE module sends the SA to a data forwarding module, where the IKE module and the data forwarding module are discrete modules.

The embodiment shown in FIG. 3 and the embodiment shown in FIG. 1 are peer processes. The embodiment shown in FIG. 1 is implemented at an end that initiates an IKE negotiation, and the embodiment shown in FIG. 3 is implemented at an end that responds to the IKE negotiation. Therefore, implementation principles and technical effects of the embodiment in FIG. 3 are similar to those of the embodiment in FIG. 1, and are not described herein again.

Optionally, the IKE module is deployed on an FPGA chip of an accelerator card. Step S302 may include processing concurrently, by the IKE module using a Montgomery algorithm according to the IPSec configuration parameter and the security policy that is in the SPD, modular multiplication required for IKE session link establishment, generating a googol, calculating a Diffie-Hellman key value, and establishing the SA with the sending device of the IKE link establishment session packet.

In an embodiment, step S303 may include writing, by the IKE module, the SA into the data forwarding module by means of RDMA or a preset protocol.

In another embodiment, step S303 may include writing, by the IKE module, the SA into a control module by means of RDMA or a preset protocol, and forwarding the SA to the data forwarding module using the control module.

In the foregoing embodiments, the IKE module sends the SA to the data forwarding module. Correspondingly, a process flow on a data forwarding module side is described below.

Figure 4:
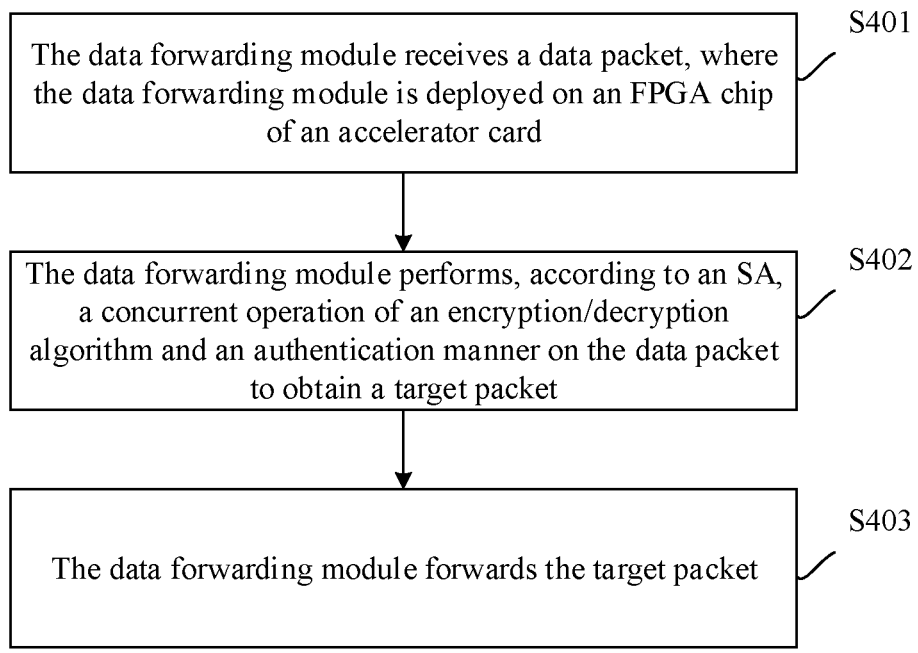
FIG. 4 is a flowchart of Embodiment 3 of an IPSec acceleration method according to the present disclosure.

FIG. 4 is a flowchart of Embodiment 3 of an IPSec acceleration method according to the present disclosure. This embodiment of the present disclosure provides an IPSec acceleration method. The method may be executed by any apparatus (in this embodiment, a data forwarding module is used as an example for description) that executes an IPSec acceleration method, and the apparatus may be implemented using software and/or hardware. As shown in FIG. 4, the method includes the following steps.

Step S401: The data forwarding module receives a data packet, where the data forwarding module is deployed on an FPGA chip of an accelerator card.

Step S402: The data forwarding module performs, according to an SA, a concurrent operation of an encryption/decryption algorithm and an authentication manner on the data packet to obtain a target packet.

Step S403: The data forwarding module forwards the target packet.

In a scenario, the data forwarding module receives a first data packet sent by a subnet device, performs encryption and encapsulation processing on the first data packet according to the SA, and forwards an obtained packet to a peer device.

In another scenario, the data forwarding module receives a second data packet sent by the peer device, performs decryption and decapsulation processing on the second data packet according to the SA, and forwards an obtained packet to the subnet device.

The subnet device is a local area network device served by a device into which the data forwarding module is integrated. The peer device includes a device that is outside a local area network and that communicates with the device into which the data forwarding module is integrated. The data packet includes the first data packet and the second data packet. The target packet includes the packet obtained after encryption and encapsulation processing is performed on the first data packet and the packet obtained after decryption and decapsulation processing is performed on the second data packet.

A difference between this embodiment and the other approaches is that the data forwarding module in the present disclosure is deployed on the FPGA chip of the accelerator card. In this way, the data forwarding module can quickly process an encapsulation security payload (ESP) protocol packet or an authentication header (AH) protocol packet, thereby reducing time consumption and accelerating data forwarding processing of IPSec in order to implement IPSec acceleration. That is, the ESP protocol packet and the AH protocol packet are included in the data packet.

In the foregoing embodiment, before step S402, the IPSec acceleration method may further include accepting, by the data forwarding module, an operation of writing the SA by the IKE module. A writing manner used for the writing is RDMA or a preset protocol, and the data forwarding module and the IKE module are discrete modules.

In this embodiment of the present disclosure, a module configured to implement an IKE link establishment function and a module configured to implement a data forwarding function are logically separated. That is, IKE link establishment is implemented using an IKE module, and a data packet is forwarded using a data forwarding module. The IKE module and the data forwarding module are independent of each other. In this way, establishment of an IPSec session can be accelerated, and flexibility of IPSec processing can be enhanced. The foregoing beneficial effects are relatively obvious in a WLAN in a high-density access scenario. In addition, in other approaches, it is relatively time-consuming for Pluto to write an SA from a user mode to a kernel mode. However, in this embodiment, the IKE module quickly transfers the SA into the remote data forwarding module by means of RDMA, without affecting an operating system. In this way, few processing functions of a computer are used. Because RDMA avoids a replication operation in an external memory and a text exchange operation, a memory bandwidth and a CPU period can be released for improving application system performance.

Figure 5:
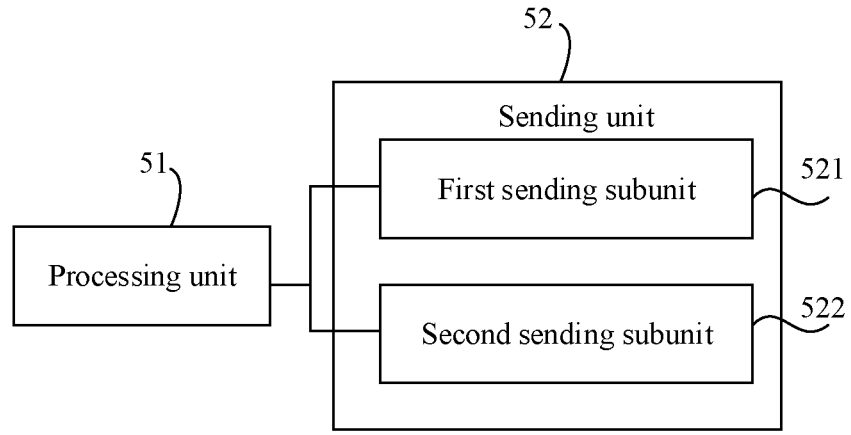
FIG. 5 is a schematic structural diagram of Embodiment 1 of an IKE module according to the present disclosure.

FIG. 5 is a schematic structural diagram of Embodiment 1 of an IKE module according to the present disclosure. This embodiment of the present disclosure provides an IKE module, and the module may be implemented using software and/or hardware. As shown in FIG. 5, an IKE module 50 includes a processing unit 51 and a sending unit 52. The sending unit 52 includes a first sending subunit 521 and a second sending subunit 522.

The processing unit 51 is configured to generate an IKE link establishment session packet according to an IPSec configuration parameter and a security policy that is in an SPD. The first sending subunit 521 is configured to send the IKE link establishment session packet to a peer device, and the IKE module 50 establishes an SA with the peer device using the IKE link establishment session packet. The second sending subunit 522 is configured to send the SA to a data forwarding module (not shown). The IKE module 50 and the data forwarding module are discrete modules.

The apparatus in this embodiment may be configured to implement the technical solution in the method embodiment shown in FIG. 1. Implementation principles and technical effects of the apparatus are similar to those in the method embodiment shown in FIG. 1, and are not described herein again.

Optionally, the IKE module 50 is deployed on an FPGA chip of an accelerator card. The processing unit 51 may be further configured to process concurrently, using a Montgomery algorithm according to the IPSec configuration parameter and the security policy that is in the SPD, modular multiplication required for IKE session link establishment, generate a googol, calculate a Diffie-Hellman key value, and generate the IKE link establishment session packet.

The second sending subunit 522 may be further configured to write the SA into the data forwarding module by means of RDMA or a preset protocol. Alternatively, the second sending subunit 522 may be further configured to write the SA into a control module (not shown) by means of RDMA or a preset protocol, and forward the SA to the data forwarding module using the control module.

Figure 6:
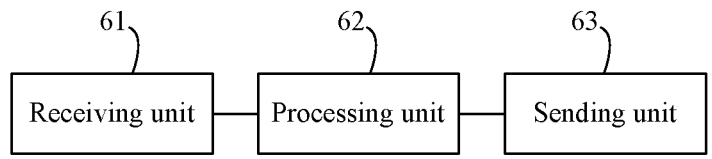
FIG. 6 is a schematic structural diagram of Embodiment 2 of an IKE module according to the present disclosure.

FIG. 6 is a schematic structural diagram of Embodiment 2 of an IKE module according to the present disclosure. This embodiment of the present disclosure provides an IKE module, and the module may be implemented using software and/or hardware. As shown in FIG. 6, an IKE module 60 includes a receiving unit 61, a processing unit 62, and a sending unit 63.

The receiving unit 61 is configured to receive an IKE link establishment session packet. The processing unit 62 is configured to establish, according to an IPSec configuration parameter and a security policy that is in an SPD, an SA with a sending device of the IKE link establishment session packet. The sending unit 63 is configured to send the SA to a data forwarding module (not shown). The IKE module 60 and the data forwarding module are discrete modules.

The apparatus in this embodiment may be configured to implement the technical solution in the method embodiment shown in FIG. 3. Implementation principles and technical effects of the apparatus are similar to those in the method embodiment shown in FIG. 3, and are not described herein again.

Further, the IKE module 60 may be deployed on an FPGA chip of an accelerator card. The processing unit 62 may be further configured to process concurrently, using a Montgomery algorithm according to the IPSec configuration parameter and the security policy that is in the SPD, modular multiplication required for IKE session link establishment, generate a googol, calculate a Diffie-Hellman key value, and establish the SA with the sending device of the IKE link establishment session packet.

The sending unit 63 may be further configured to write the SA into the data forwarding module by means of RDMA or a preset protocol. Alternatively, the sending unit 63 may be further configured to write the SA into a control module (not shown) by means of RDMA or a preset protocol, and forward the SA to the data forwarding module using the control module.

Figure 7:
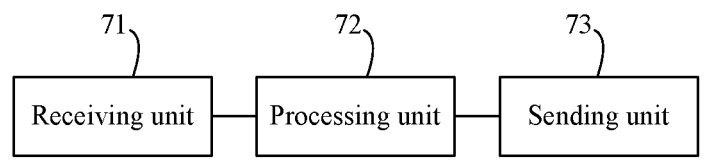
FIG. 7 is a schematic structural diagram of Embodiment 1 of a data forwarding module according to the present disclosure.

FIG. 7 is a schematic structural diagram of Embodiment 1 of a data forwarding module according to the present disclosure. This embodiment of the present disclosure provides a data forwarding module 70. The data forwarding module 70 may be implemented using software and/or hardware, and the module is deployed on an FPGA chip of an accelerator card. As shown in FIG. 7, the data forwarding module 70 includes a receiving unit 71, a processing unit 72, and a sending unit 73.

The receiving unit 71 is configured to receive a data packet. The processing unit 72 is configured to perform, according to an SA, a concurrent operation of an encryption/decryption algorithm and an authentication manner on the data packet to obtain a target packet. The sending unit 73 is configured to forward the target packet.

The apparatus in this embodiment may be configured to implement the technical solution in the method embodiment shown in FIG. 4. Implementation principles and technical effects of the apparatus are similar to those in the method embodiment shown in FIG. 4, and are not described herein again.

Optionally, the data forwarding module 70 may further include a storage unit (not shown). The storage unit is configured to accept an operation of writing the SA by an IKE module. A writing manner used for the writing is RDMA or a preset protocol. The data forwarding module and the IKE module are discrete modules.

Figure 8:
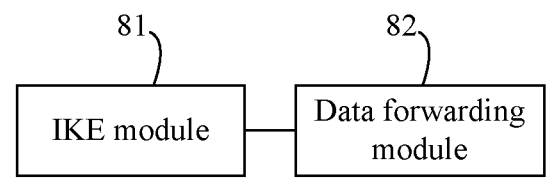
FIG. 8 is a schematic structural diagram of Embodiment 1 of an IPSec acceleration system according to the present disclosure.

FIG. 8 is a schematic structural diagram of Embodiment 1 of an IPSec acceleration system according to the present disclosure. This embodiment of the present disclosure provides an IPSec acceleration system. As shown in FIG. 8, an IPSec acceleration system 80 includes an IKE module 81 and a data forwarding module 82. The IKE module 81 and the data forwarding module 82 are separately deployed independently in different acceleration devices (not shown). A connection between the IKE module 81 and the data forwarding module 82 may be a wired connection or a wireless connection (for example, a network connection).

The IKE module 81 is configured to perform IKE link establishment. The data forwarding module 82 is configured to forward a data packet.

Further, when the IPSec acceleration system 80 acts as a proactive end (an initiating end) of IPSec, the IKE module 81 is configured to generate an IKE link establishment session packet according to an IPSec configuration parameter and a security policy that is in an SPD, send the IKE link establishment session packet to a peer device, establish an SA with the peer device, and send the SA to the data forwarding module 82. In this case, the data forwarding module 82 is configured to receive a first data packet sent by a subnet device, perform encryption and encapsulation processing on the first data packet according to the SA, forward an obtained packet to the peer device, receive a second data packet sent by the peer device, perform decryption and decapsulation processing on the second data packet according to the SA, and forward an obtained packet to the subnet device. The subnet device is a local area network device served by a device into which the data forwarding module 82 is integrated.

When the IPSec acceleration system 80 acts as a reactive end (a non-initiating end) of IPSec, the IKE module 81 is further configured to receive an IKE link establishment session packet, establish, according to an IPSec configuration parameter and a security policy that is in an SPD, an SA with a sending device of the IKE link establishment session packet, and send the SA to the data forwarding module 82. The data forwarding module 82 is configured to receive a first data packet sent by the sending device, perform decryption and decapsulation processing on the first data packet according to the SA, forward an obtained packet to a subnet device, receive a second data packet sent by the subnet device, perform encryption and encapsulation processing on the second data packet according to the SA, and forward an obtained packet to the sending device. The subnet device is a local area network device served by a device into which the data forwarding module 82 is integrated.

Persons of skill in the art may understand each of the first data packet and the second data packet as an ESP protocol packet, an AH protocol packet, or the like. It should also be noted that, in any embodiment of the present disclosure, "first" and "second" are only for distinguishing different data packets and are not used to indicate the first of data packets and the second of the data packets.

In other approaches, both IKE link establishment and data forwarding are completed by a single VM or physical machine, causing a low IPSec speed. In this embodiment of the present disclosure, a module configured to implement an IKE link establishment function and a module configured to implement a data forwarding function are logically separated. That is, IKE link establishment is implemented using an IKE module, and a data packet is forwarded using a data forwarding module. The IKE module and the data forwarding module are independent of each other and are separately deployed in different acceleration devices. In this way, establishment of an IPSec session can be accelerated, for example, time consumption for googol generation and Diffie-Hellman key value calculation can be reduced. In addition, flexibility of IPSec processing can be enhanced. The foregoing beneficial effects are relatively obvious in a WLAN in a high-density access scenario.

In the foregoing embodiment, the data forwarding module 82 may be configured to perform calculation of data packet AH authentication, and the like. For a specific function of the data forwarding module 82, refer to processing of a data packet by, for example, a LINUX kernel in the other approaches, and details are not described herein.

Figure 9:
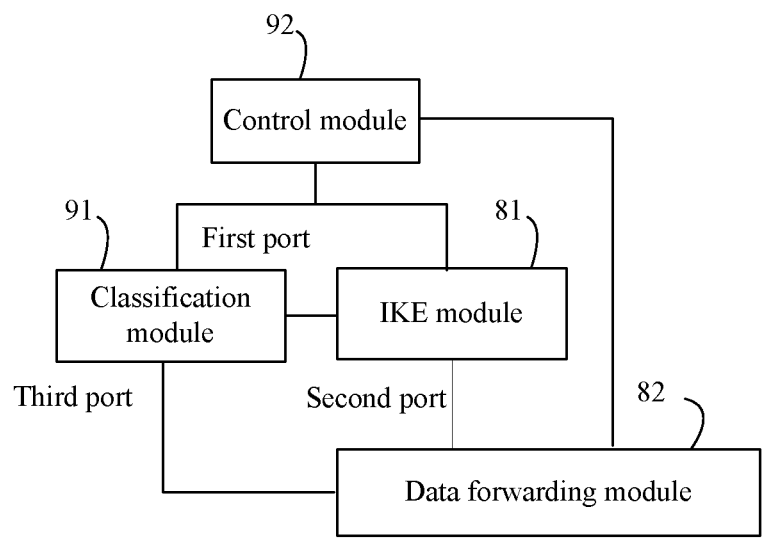
FIG. 9 is a schematic structural diagram of Embodiment 2 of an IPSec acceleration system according to the present disclosure.

FIG. 9 is a schematic structural diagram of Embodiment 2 of an IPSec acceleration system according to the present disclosure. As shown in FIG. 9, based on the embodiment shown in FIG. 8, an IPSec acceleration system 90 may further include a classification module 91. The classification module 91 may be configured to receive a packet, retrieve a preset classification policy, and distribute the packet. The received and distributed packet includes the IKE link establishment session packet and the data packet.

Further, the classification module 91 retrieves the preset classification policy, for example, an access control list (ACL) rule. The ACL rule includes a source IP address, a source port, a destination IP address, a destination port, and a protocol number of the packet. A packet whose destination address is the IKE module 81 and whose destination port number is 500 or 4500 is sent to the IKE module 81. A packet whose destination address is the data forwarding module 82 is sent to the data forwarding module 82. Referring to FIG. 9, the example may be expressed as the following content when reflected in an ACL:

Condition 1: a packet whose destination IP address is the IKE module 81 and whose destination port number is 500; action 1: forward from a second port to the IKE module 81;

Condition 2: a packet whose destination IP address is the IKE module 81 and whose destination port number is 4500; action 2: forward from a second port to the IKE module 81; and Condition 3: a packet whose destination IP address is an IP address of an IPSec protection subnet device; action 3: forward from a third port to the data forwarding module 82.

Further, the IPSec acceleration system 90 may further include a control module 92. The control module 92 may be configured to send the IPSec configuration parameter to the IKE module 81. Optionally, the control module 92 may be further configured to send the preset classification policy to the classification module 91. In addition, the classification module 91 sends a packet that is not mentioned above to the control module 92 for processing.

Based on the structure embodiment shown in FIG. 9, the following provides a detailed description about the IPSec acceleration method in the embodiments of the present disclosure using several specific embodiments.

Figure 10:
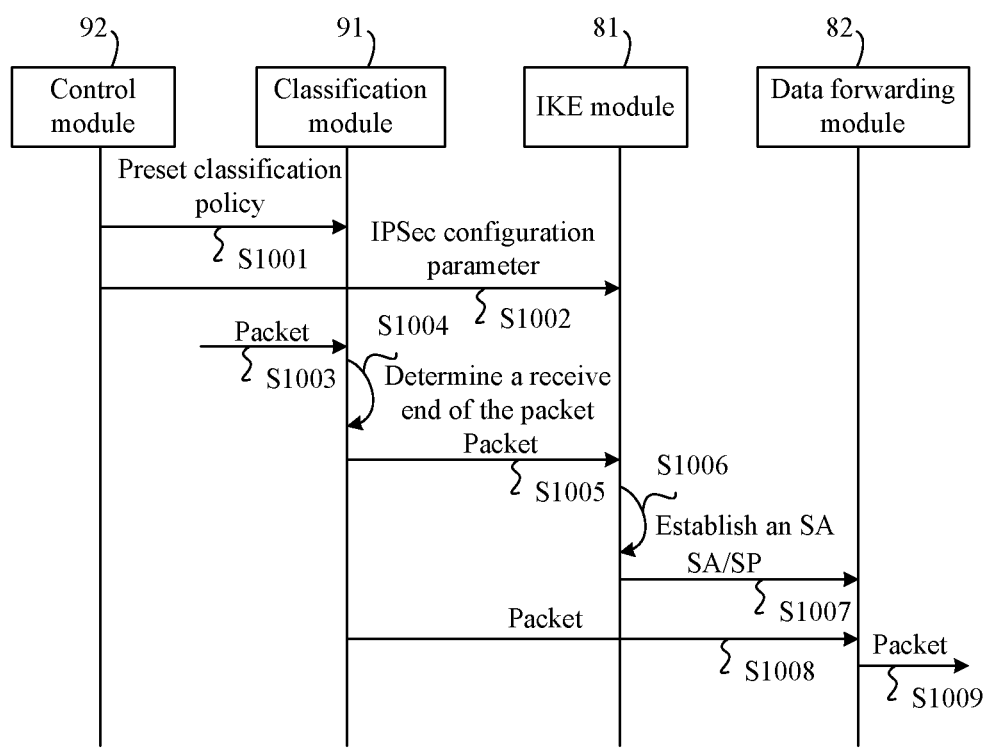
FIG. 10 is a flowchart of Embodiment 4 of an IPSec acceleration method according to the present disclosure.

In an embodiment, the IKE module 81 maintains an SA database and an SPD. FIG. 10 is a flowchart of Embodiment 4 of an IPSec acceleration method according to the present disclosure. As shown in FIG. 10, the method includes the following steps.

Step S1001: The control module 92 sends a preset classification policy to the classification module 91.

Step S1002: The control module 92 sends an IPSec configuration parameter to the IKE module 81.

Steps S1001 and S1002 are optional steps.

Step S1003: The classification module 91 receives a packet.

Step S1004: The classification module 91 determines a receive end of the packet according to the preset classification policy. If a destination address of the packet is the IKE module 81 and a port number of the packet is 500 or 4500, steps S1005 to S1007 are performed. If a destination address of the packet is the data forwarding module 82, steps S1008 to S1009 are performed. Another packet is sent to the control module 92, and the control module 92 performs processing, for example, discarding the packet.

Step S1005: The classification module 91 sends the packet to the IKE module 81.

In this step, the packet may be understood as an IKE link establishment session packet.

Step S1006: The IKE module 81 establishes an SA with a peer device using the packet.

Step S1007: The IKE module 81 sends the SA/a security policy (designated as SP in FIG. 10) to the data forwarding module 82.

Step S1008: The classification module 91 sends the packet to the data forwarding module 82.

In this step, the packet may be understood as a data packet, for example, the first data packet and the second data packet described above.

Step S1009: The data forwarding module 82 forwards the packet according to an established SA.

Further, the data forwarding module 82 receives a first data packet sent by the peer device (for example, the sending device described above), performs decryption and decapsulation processing on the first data packet according to the SA, and forwards an obtained packet to a subnet device. Alternatively, the data forwarding module 82 receives a second data packet sent by a subnet device, performs encryption and encapsulation processing on the second data packet according to the SA, and forwards an obtained packet to the peer device. The subnet device is a local area network device served by a device into which the data forwarding module 82 is integrated.

In the foregoing embodiment, the IKE module 81 maintains the SA database and the SPD.

Figure 11:
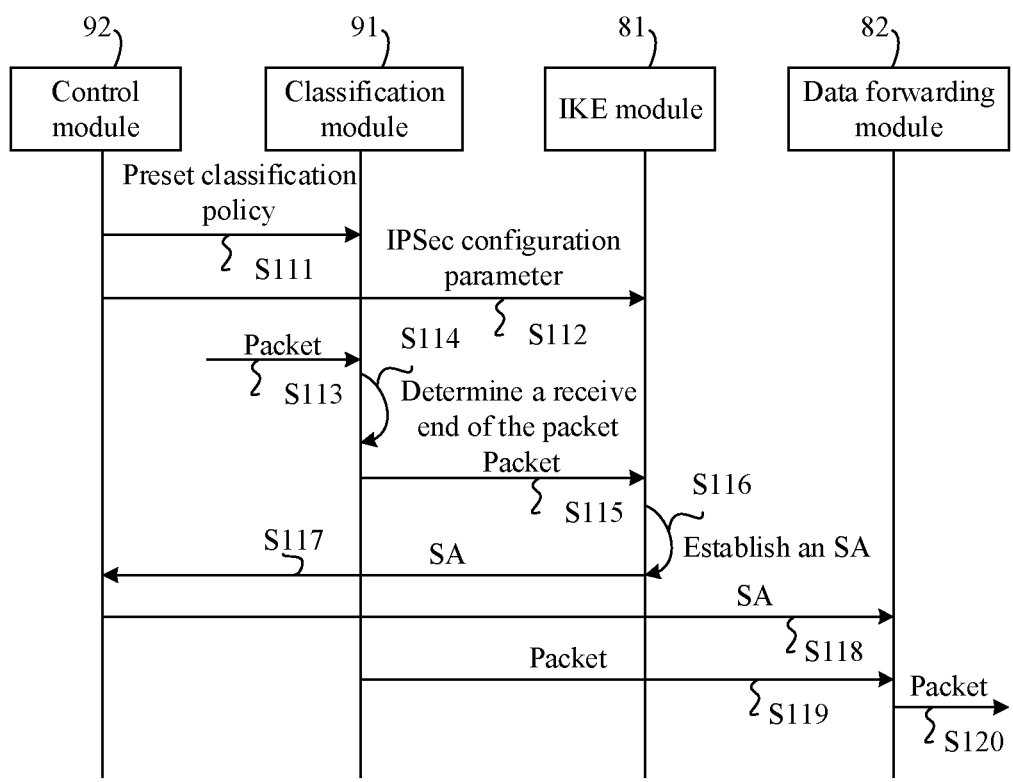
FIG. 11 is a flowchart of Embodiment 5 of an IPSec acceleration method according to the present disclosure.

In another embodiment, the control module 92 maintains an SA database and an SPD. FIG. 11 is a flowchart of Embodiment 5 of an IPSec acceleration method according to the present disclosure. As shown in FIG. 11, the method includes the following steps.

Step S111: The control module 92 sends a preset classification policy to the classification module 91.

Step S112: The control module 92 sends an IPSec configuration parameter to the IKE module 81.

Steps S111 and S112 are optional steps.

Step S113: The classification module 91 receives a packet.

Step S114: The classification module 91 determines a receive end of the packet according to the preset classification policy. If a destination address of the packet is the IKE module 81 and a port number of the packet is 500 or 4500, steps S115 to S118 are performed. If a destination address of the packet is the data forwarding module 82, steps S119 to S120 are performed. Another packet is sent to the control module 92, and the control module 92 performs processing, for example, discarding the packet.

Step S115: The classification module 91 sends the packet to the IKE module 81.

In this step, the packet may be understood as an IKE link establishment session packet.

Step S116: The IKE module 81 establishes an SA with a peer device using the packet.

Step S117: The IKE module 81 sends the SA to the control module 92.

Step S118: The control module 92 sends the SA to the data forwarding module 82.

Step S119: The classification module 91 sends the packet to the data forwarding module 82.

In this step, the packet may be understood as a data packet, for example, the first data packet and the second data packet described above.

Step S120: The data forwarding module 82 forwards the packet according to an established SA.

In this embodiment, the IKE module 81 first sends the SA to the control module 92, and then the control module 92 sends the SA to the data forwarding module 82. The control module 92 manages the SA database.

RDMA and/or a preset protocol may be used for data transmission between different modules, for example, SA transmission between the IKE module 81 and the data forwarding module 82, SA transmission between the IKE module 81 and the control module 92, or SA transmission between the control module 92 and the data forwarding module 82. This is not limited in the present disclosure.

It should also be noted that the IPSec acceleration system in the embodiments of the present disclosure may include at least the following three types.

Type 1: The IKE module 50 shown in FIG. 5 and the data forwarding module 70 shown in FIG. 7 are included.

Type 2: The IKE module 60 shown in FIG. 6 and the data forwarding module 70 shown in FIG. 7 are included.

Type 3: The IKE module 50 shown in FIG. 5, the IKE module 60 shown in FIG. 6, and the data forwarding module 70 shown in FIG. 7 are included.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a RAM, a magnetic disk, or an optical disc.

Finally, it should be noted that the foregoing embodiments are only intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A method implemented by a first module in a device, wherein the method comprises:
    establishing, according to an Internet Protocol Security (IPsec) configuration parameter and a security policy, a security association (SA) with a peer device, wherein the IPSec configuration parameter comprises a gateway Internet Protocol (IP) address, a subnet device IP address, an IPsec working mode, an encapsulation format, an Internet Key Exchange (IKE) SA, or an IKE SA life cycle; and
    sending information about the SA to a second module through Remote Direct Memory Access (RDMA) or a preset protocol,
    wherein the first module is in a first virtual machine or a first physical device, and
    wherein the second module is in a second virtual machine or a second physical device.

2. The method of claim 1, further comprising:
    generating an IKE link establishment session packet according to the IPsec configuration parameter and the security policy; and
    sending the IKE link establishment session packet to the peer device.

3. The method of claim 2, further comprising:
    processing, by using a Montgomery algorithm according to the IPSec configuration parameter and the security policy, modular multiplication required for IKE session link establishment;
    generating a googol; and
    calculating a Diffie-Hellman key value.

4. The method of claim 1, further comprising receiving an IKE link establishment session packet from the peer device.

5. The method of claim 4, wherein the IPSec working mode comprises a tunnel mode and a transport mode.

6. The method of claim 1, further comprising:
    writing the SA into a control module through the RDMA or the preset protocol; and
    forwarding the SA to the second module through the control module.

7. The method of claim 1, wherein the first module is in a field-programmable gate array (FPGA) chip.

8. The method of claim 1, wherein the first physical device is in an accelerator card, a server, or a cluster.

9. A first module configured to:
    establish, according to an Internet Protocol Security (IPsec) configuration parameter and a security policy, a security association (SA) with a peer device, wherein the IPSec configuration parameter comprises a gateway Internet Protocol (IP) address, a subnet device IP address, an IPsec working mode, an encapsulation format, an Internet Key Exchange (IKE) SA, or an IKE SA life cycle; and
    send information about the SA to a second module through Remote Direct Memory Access (RDMA) or a preset protocol,
    wherein the first module is in a first virtual machine or a first physical device, and
    wherein the second module is in a second virtual machine or a second physical device.

10. The first module of claim 9, wherein the first module is further configured to:
    generate an IKE link establishment session packet according to the IPsec configuration parameter and the security policy; and
    send the IKE link establishment session packet to the peer device.

11. The first module of claim 10, wherein the IPSec working mode comprises a tunnel mode and a transport mode.

12. The first module of claim 10, wherein the first module is further configured to:
    process, by using a Montgomery algorithm according to the IPSec configuration parameter and the security policy, modular multiplication required for IKE session link establishment;
    generate a googol; and
    calculate a Diffie-Hellman key value.

13. The first module of claim 9, wherein the first module is further configured to receive an IKE link establishment session packet from the peer device.

14. The first module of claim 9, wherein the first module is further configured to:
    write the SA into a control module through the RDMA or the preset protocol; and
    forward the SA to the second module through the control module.

15. The first module of claim 9, wherein the first module is in a field-programmable gate array (FPGA) chip.

16. The first module of claim 9, wherein the first physical device is in an accelerator card, a server, or a cluster.

17. The first module of claim 9, wherein the first module is further configured to maintain an SA database and a security policy database.

18. The method of claim 1, wherein the second physical device is in an accelerator card, a server, or a cluster.

19. A second device comprising:
a data forwarding module configured to:
receive a data packet;
receive, through Remote Direct Memory Access (RDMA) or a preset protocol, a security association (SA) from an Internet Key Exchange (IKE) module in a first device that is separated from the second device; and
perform, according to the SA, a concurrent operation of an encryption/decryption algorithm and an authentication manner on the data packet to obtain a target data packet; and
a processor coupled to the data forwarding module and configured to:
process the data packet using the SA,
wherein the second device is in a second virtual machine or a second physical device.

20. The second device of claim 19, wherein the processor is further configured to encrypt or decrypt the data packet.

21. The second device of claim 19, wherein the second physical device is an accelerator card, a server, or a cluster.

22. The second device of claim 19, wherein the second device is in a field-programmable gate array (FPGA) chip.

23. The second device of claim 19, wherein the second device is in a field-programmable gate array (FPGA) chip of an accelerator card.

24. The second device of claim 19, wherein the first device is in a first physical device or a first virtual machine.

25. A system comprising:
a second device;
a peer device; and
a first device separated from the second device, communicably coupled to the second device and the peer device, and configured to:
establish, according to an Internet Protocol Security (IPsec) configuration parameter and a security policy, a security association (SA) with the peer device, wherein the IPSec configuration parameter comprises a gateway Internet Protocol (IP) address, a subnet device IP address, an IPsec working mode, an encapsulation format, an Internet Key Exchange (IKE) SA, or an IKE SA life cycle; and
send the SA to the second device through Remote Direct Memory Access (RDMA) or a preset protocol.

26. The system of claim 25, wherein the second device is configured to process a data packet using the SA.

27. The system of claim 26, wherein the second device is configured to encrypt or decrypt the data packet.

28. The system of claim 25, wherein the second device is in an accelerator card, a virtual machine, a server, or a cluster.

29. The system of claim 25, wherein the second device is in a field-programmable gate array (FPGA) chip.

30. The system of claim 25, wherein the second device is in a field-programmable gate array (FPGA) chip of an accelerator card.

31. The system of claim 25, wherein the system is a wireless local area network (WLAN).

32. The system of claim 25, wherein the first device is in a first physical device or a first virtual machine.

33. The system of claim 32, wherein the first physical device is in an accelerator card, a server, or a cluster.

34. The system of claim 25, wherein the second device is in a second physical device or a second virtual machine.

35. The system of claim 34, wherein the second physical device is in an accelerator card, a server, or a cluster.

36. The method of claim 1, wherein the first module is an IKE module.

37. The method of claim 1, wherein the second module is a data forwarding module.

38. The method of claim 1, further comprising maintaining an SA database and a security policy database.

39. The first module of claim 9, wherein the first module is an IKE module.

* * * * *